United States Patent [19]
Allen et al.

[11] Patent Number: 5,786,888
[45] Date of Patent: Jul. 28, 1998

[54] PULSED RADIATION CLASSIFIER AND RELATED METHOD

[75] Inventors: Mark T. Allen; Richard E. Preston, both of Princeton, N.J.; Christopher G. Simi, Chantilly, Va.

[73] Assignees: TRW Inc., Redondo Beach, Calif.; The United States of America as represented by the Secretary of the Army, Washington, D.C.

[21] Appl. No.: 931,432

[22] Filed: Sep. 16, 1997

[51] Int. Cl.⁶ .................................................. G01J 3/12
[52] U.S. Cl. ................................. 356/73; 356/326
[58] Field of Search ...................... 356/73, 326, 328; 250/226

[56] References Cited

U.S. PATENT DOCUMENTS 3,547,542  12/1970  Bulpitt et al. ........................... 356/326

Primary Examiner—F. L. Evans
Attorney, Agent, or Firm—Michael S. Yatsko

[57] ABSTRACT

Apparatus and a related method for detecting laser pulses and classifying them in accordance with their wavelength, irradiance level, shape and time of occurrence. Each pulse received from a selected field of regard (10) is detected in a high-speed broadband radiometer (12), which generates a corresponding electrical pulse that is used to form a triggering pulse to control a gated camera (24) coupled to a transmission grating spectrometer (22). The gated camera (24) has an inherent delay time before it becomes active after receiving a gating signal (30). To compensate for this delay, light from each laser pulse passes through a fiber image delay line (16) before reaching the transmission grating spectrometer (22). Output data signals from the camera (24) are processed (40) to reduce the effects of background noise and converted (42) to a quantity indicative of wavelength. The electrical pulse from the radiometer (12) is also used to generate additional quantities indicative of pulse shape, as well as to generate, in a thresholding circuit (34), the camera triggering signal and to generate, in another circuit (36), a camera gain control signal.

8 Claims, 2 Drawing Sheets

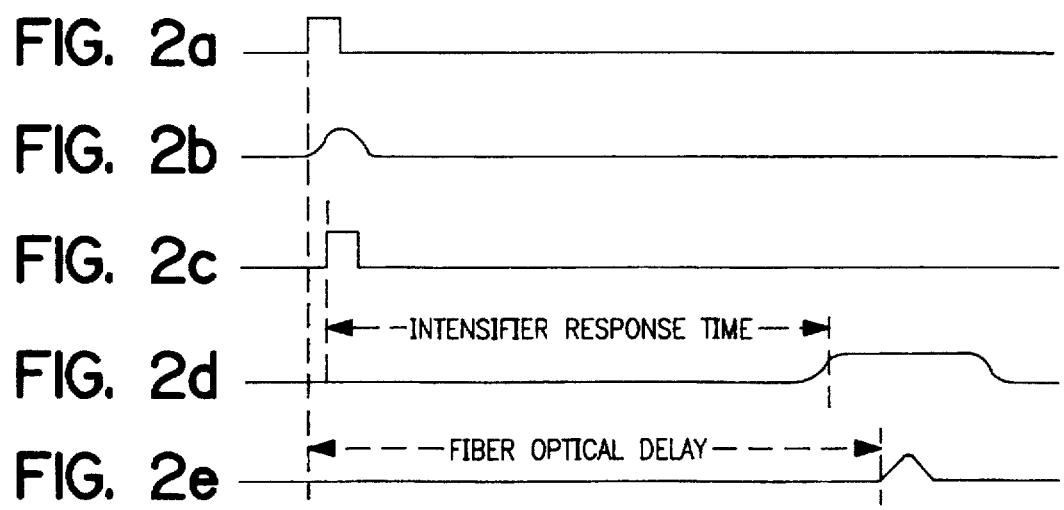

PULSED RADIATION CLASSIFIER AND RELATED METHOD

BACKGROUND OF THE INVENTION

This invention was made with government support awarded from The Department of Army. The government has certain rights in this invention.

This invention relates generally to techniques for detecting and classifying laser pulses and, more particularly, to the detection and characterization of extremely low levels of pulsed laser radiation, even in the presence of strong background radiation. Pulsed laser radiation is used in a variety of both military and commercial applications, such as atmospheric research. In many applications, there is a need to characterize a pulse of laser radiation completely, in terms of its irradiance level, pulse width and wavelength. Moreover, in general any system used to perform this function must provide continuous temporal monitoring, since the time that a pulse will occur may be unknown. Techniques of pulse detection prior to the present invention have been limited in some way, such as to an analysis of discrete spectral regions or high contrast irriadiance levels. In brief, such prior techniques all required prior knowledge of the laser wavelength, or close proximity and precise alignment to the laser source.

Accordingly, there is still a need for a technique of laser pulse analysis that completely characterizes laser pulses without prior knowledge of their spectral or other properties, and without prior knowledge of their times of occurrence. The present invention satisfies this need, as will become apparent from the following brief summary of the invention's principal features.

SUMMARY OF THE INVENTION

The present invention resides in a pulsed radiation classifier, comprising a gated spectrometer providing a measure of wavelength of a detected laser pulse; a radiometer for generating an output pulse that provides a measure of irradiance, width and time of occurrence of the detected laser pulse; a triggering circuit, using the radiometer response to generate a gating signal for the gated spectrometer at approximately the time of detection of the laser pulse; and an optical delay device for delaying the detected laser pulse from reaching the gated spectrometer until the spectrometer has been gated to an active condition. In the illustrative embodiment of the invention, the gated spectrometer includes a dispersing grating onto which the laser pulse is directed from the optical delay device; and a gated camera aligned to receive light from the dispersing grating, for producing a data array indicative of the wavelength of the laser pulse. In accordance with an important aspect of the invention, the gated camera is controlled in part by a gain adjustment circuit under the control of an amplitude signal derived from the radiometer output. Furthermore, the radiometer output pulse also provides pulse width and pulse height data for use in classifying the input pulse in association with the pulse wavelength.

The invention may also be defined as a method for detecting and classifying laser pulses, comprising the steps of detecting a laser pulse using a high-speed broadband radiometer and generating a corresponding electrical output pulse; approximately simultaneously with the detecting step, launching light from the same laser pulse into a fiber image delay line; coupling light from the delay line into a gated spectrometer; generating a spectrometer gating signal from the electrical output pulse from the radiometer; and applying the gating signal to the gated spectrometer. The gated spectrometer is rendered active only after an inherent delay time, and the fiber image delay line is selected to provide a delay comparable with the inherent delay time of the gated spectrometer.

The method may further comprise the steps of generating from the radiometer output pulse an additional signal indicative of the magnitude of the pulse; and adjusting the gain of the gated spectrometer in an inverse relationship to the additional signal indicative of magnitude. More powerful pulses are, therefore, intensified to a lesser degree in the gated spectrometer. Additional steps include generating from the gated spectrometer an output data signal indicative of the wavelength of the detected laser pulse; processing the output data signal to reduce the effect of detector and scene background; converting the resultant output data signal to a quantity indicative of wavelength; and classifying the pulse in accordance with its measured wavelength.

The method may further include the steps of generating from the radiometer output pulse signals indicative of pulse shape; and storing wavelength and pulse shape parameters characterizing the detected laser pulse.

It will be appreciated from this summary that the present invention represents a significant advance in the field of detection and classification of laser pulses of generally unknown wavelength, pulse shape and time of occurrence. Use of a fiber image delay line in conjunction with a radiometer provides for spectral analysis of a pulse, regardless of when it occurs, and yields reliable pulse characterizing data, including irradiance level, wavelength and pulse shape data. Other aspects and advantages of the invention will become apparent from the following more detailed description, considered in conjunction with the accompanying drawings.

BRIEF DESCRIPTION OF THE DRAWINGS

FIGS. 2a through 2e together constitute a timing diagram illustrating how the pulsed radiation classifier of the invention functions, wherein FIG. 2a shows a typical laser pulse, FIG. 2b is the corresponding radiometer response signal, FIG. 2c is a trigger pulse generated from the radiometer response signal, FIG. 2d is the gated camera response characteristic, and FIG. 2e depicts the laser pulse after its planned delay.

DESCRIPTION OF THE PREFERRED EMBODIMENT

Figure 1:
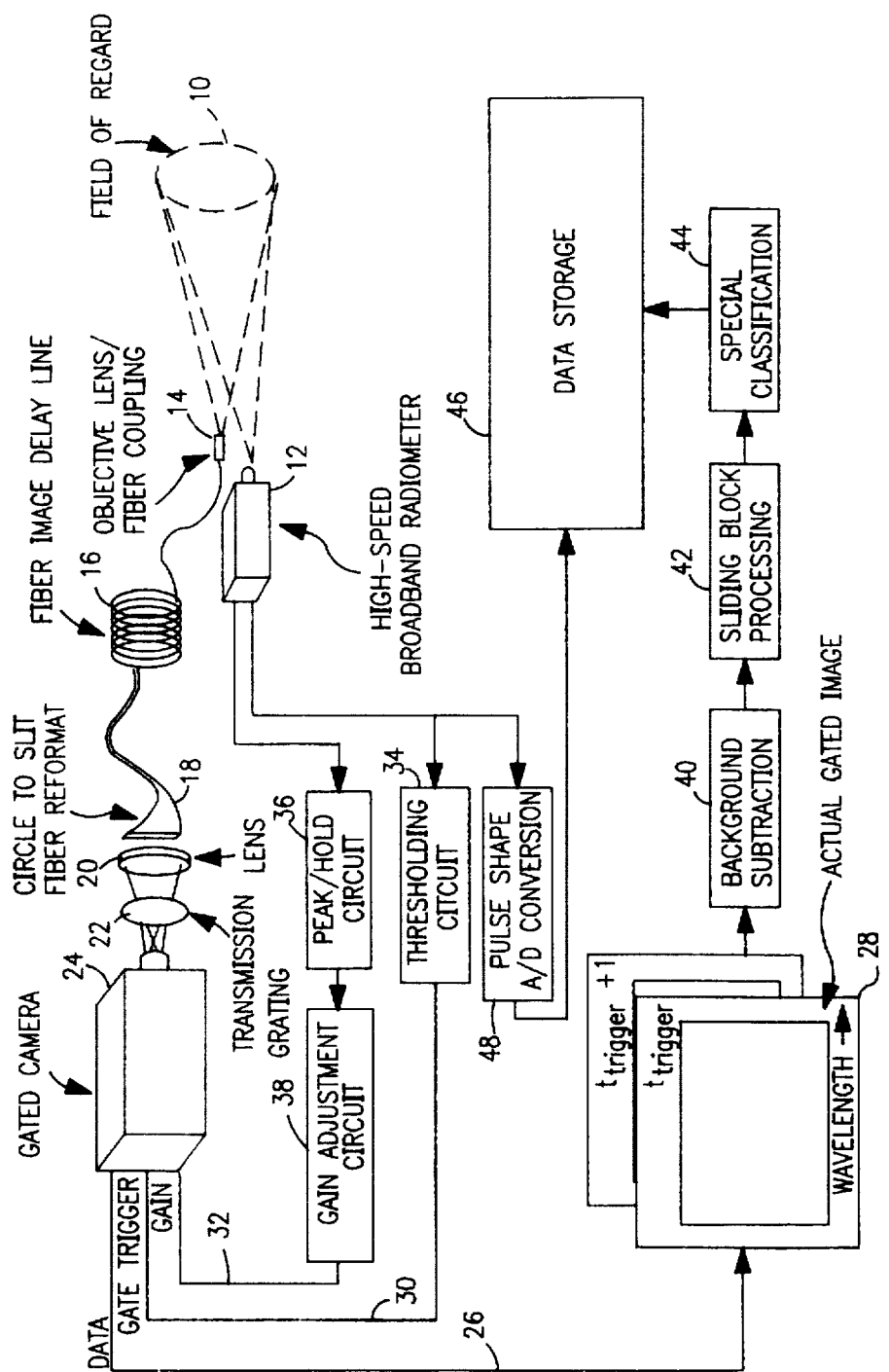
FIG. 1 is a block diagram showing the principal features of a pulsed radiation classifier in accordance with the invention.

As shown in the drawings for purposes of illustration, the present invention pertains to apparatus, and a related method for its operation, for detecting and classifying laser pulses. More specifically, FIG. 1 shows the apparatus of the invention as providing two optical signal paths when processing a pulse having a source in a field of regard, indicated by reference numeral 10. Pulsed radiation arriving at the apparatus is received both in a high-speed broadband radiometer 12 and in a separate but closely adjacent objective lens 14, which is coupled to a fiber image delay line 16. Briefly, and as will be explained in more detail, the radiometer 12 detects an incoming pulse of light and generates a corresponding electrical pulse, from which measurements of pulse amplitude, pulse width and time of occurrence are generated. As will also be further explained, light traversing the other optical path, through the fiber image delay line 16, is employed to obtain a measure of the wavelength of the pulse, using timing and other information obtained from the radiometer 12.

The fiber image delay line 16 has, at its end opposite the objective lens 14, a transition element 18 that reformats the individual fibers in the delay line from a circular format to a slit format, as indicated in the drawing. Light emerging from the slit output of the transition element 18 is collimated by a lens 20 onto a transmission grating 22, which deflects the incident light through an angle dependent on wavelength. The transmission grating 22 is selected in accordance with the expected spectral bandwidth to be analyzed by the apparatus.

After passing through the transmission grating 22, a laser pulse emerging from the fiber image delay line 16 enters a gated camera 24 which creates a spectrally dispersed image of the entrance slit of the spectrometer, intensifies the incident light and produces two-dimensional optical output data, on line 26, having characteristics similar to those shown in the pictorial representation 28. The gated camera 24 has a gate trigger input line 30, on which a control signal is supplied to gate or activate the camera at an appropriate time, and a gain control line 32, on which a gain control signal is supplied to vary the degree to which the camera 24 intensifies the optical signal it receives from the transmission grating 22.

As detected by the radiometer 12, a laser pulse, FIG. 2a, is seen as a slightly delayed and rounded version of the incident pulse. FIG. 2b. A thresholding circuit 34 is used to generate a conditioned gate trigger pulse as shown in FIG. 2c. This pulse is applied as a gating signal over line 30 to the gated camera 24. The characteristics of the camera 24 are such that it has a relatively long response time after receiving a gating signal and before it will operate as an intensifier, as shown in FIG. 2d. Further, the camera 24 remains active for a period somewhat longer than the width of the incident pulse of FIG. 2e.

Ideally, the laser pulse should enter the camera 24 only during the interval in which the camera is triggered to operate. As shown in FIG. 2d, this is accomplished in the present invention by selecting the fiber image delay line 16 to provide a delay sufficient to place the input pulse near the center of the gated period of operation of the camera 24.

Another circuit used to control the camera 24 is a peak hold circuit 36, which also receives output from the radiometer 12 and measures the peak height of the output radiometer response (FIG. 2b). A signal indicative of the peak height is supplied by the peak hold circuit 36 to a gain adjustment circuit 38, which, in turn, supplies a gain control signal on line 32 to the camera 24. Laser pulses of very low amplitude require more intensification in the camera 24. More powerful pulses require only low intensification. The specific characteristics of the gain control signals will depend, of course, on the specifications of the camera 24.

Output from the gated camera 24 is in the form of a two-dimensional data field similar to that shown in the pictorial representation 28. For a monochromatic point source laser pulse, the data field contains a spot, the position of which along one axis is indicative of the wavelength of the laser pulse.

A difficulty arises when the detected laser pulse is of relatively low power and there is a relatively constant DC background from the detector and other light sources. This background noise may obscure detection of the wavelength of the pulse of interest. In accordance with another aspect of the present invention, DC signal components may be reduced by gating the camera 24 a second time, during the next camera frame period. The later triggering of the camera should produce a data output that results solely from the background components closely similar to those processed with the detected laser pulse. If the two data outputs are subtracted, as indicated in block 40, the background components are eliminated or significantly reduced. The resultant two-dimensional output data are further processed to obtain a digital signal representative of the spectral wavelength of the processed pulse and minimize the effect of noise, as indicated in block 42. For example, sliding block processing can be used to optimize the signal to noise ratio.

Finally, the signals indicative of wavelength are processed in a spectral classification function 44. Depending on the application of the apparatus, spectral classification may include comparison of the wavelength data with other similar data from other known types of laser pulses, or may simply include categorizing the wavelength result according to a predefined wavelength scale. The spectrally classified data are then stored in a data storage device 46 for possible later analysis.

The radiometer response data (FIG. 2b) are also subject to processing in an additional processing block 48, for pulse shape analysis and analog-to-digital (A/D) conversion. Basically, this block generates data indicative of the width and irradiance level of the detected pulse, and these data are stored in the data storage device 46 in association with the spectral data of the detected pulse.

Although the components discussed above may be selected from a variety of available alternatives, the following specific choices are presently preferred for detecting pulses in visible light wavelengths. Other components may need to be selected for other wavelengths of interest.

The fiber optic image delay line 16 may be a Sumitomo Silica Image Guide, manufactured by Sumitomo Industries, Los Angeles, Calif. The circle-to-slit reformatting or transition element 18 may comprise short lengths of 50×50 micron ($\mu$m) fiber matrices composed of 10 micron ($\mu$m) square glass elements in a circular-to-slit format, manufactured by Schott Fiber Optics, Southbridge, Mass.

The gated camera 24 may be an intensified CCD (charge-coupled device) camera using a Gen III image intensifier. The photocathode of the camera is selected for highest efficiency at the wavelengths of interest. It is believed that electron bombarded CCDs (EBCCDs) will perform significantly better than ICCDs, and will probably be preferred once they become more readily available.

The transmission grating 22, which performs the function of a spectrometer, may be obtained from Ralcon Development Laboratory, Paradise, Utah. The transmission grating 22 may be replaced by a reflective grating, with appropriate changes to the optical design. In any event, the dispersing element, whether transmissive or reflective, is tailored for the spectral coverage and resolution desired.

The radiometer 12 may be a high bandwidth, high sensitivity silicon radiometer, obtained from SciTec, Inc., Princeton, N.J., which may also supply the associated camera control electronics and processing software.

It will be appreciated from the foregoing that the present invention provides a novel approach to the detection and classification of laser pulses. Using the invention, a laser pulse is classified according to its wavelength, width and amplitude, regardless of its time of occurrence. A fiber image delay line for pulses entering a spectrometer delays each input pulse just long enough to allow the spectrometer to be gated into an active condition before the input pulse is processed. A radiometer provides timing signals for the spectrometer and also yields a measure of pulse shape and height. It will also be appreciated that, although a specific embodiment of the invention has been described in detail for purposes of illustration, various modifications may be made without departing from the spirit and scope of the invention. Accordingly, the invention should not be limited except as by the appended claims.

We claim:

1. A pulsed radiation classifier, comprising:

a gated spectrometer providing a measure of wavelength of a detected laser pulse;

a radiometer for generating an output pulse that provides a measure of irradiance, width and time of occurrence of the detected laser pulse;

a triggering circuit, using the radiometer output pulse to generate a gating signal for the gated spectrometer at approximately the time of detection of the laser pulse; and an optical delay device for delaying the detected laser pulse from reaching the gated spectrometer until the spectrometer has been gated to an active condition.

2. A pulsed radiation classifier as defined in claim 1, wherein the gated spectrometer includes:

a dispersing grating onto which the laser pulse is directed from the optical delay device; and a gated camera aligned to receive light from the dispersing grating, for producing a data array indicative of the wavelength of the laser pulse.

3. A pulsed radiation classifier as defined in claim 2, wherein:

the gated camera is controlled in part by a gain adjustment circuit under the control of an amplitude signal derived from the radiometer output.

4. A pulsed radiation classifier as defined in claim 1, wherein the radiometer output pulse also provides pulse width and pulse height data for use in classifying the input pulse in association with the pulse wavelength.

5. A method for detecting and classifying laser pulses, comprising the steps of:

detecting a laser pulse using a high-speed broadband radiometer and generating a corresponding electrical output pulse;

approximately simultaneously with the detecting step, launching light from the same laser pulse into a fiber image delay line;

coupling light from the delay line into a gated spectrometer;

generating a spectrometer gating signal from the electrical output pulse from the radiometer; and applying the gating signal to the gated spectrometer, which is rendered active after an inherent delay time, wherein the delay line is selected to provide delay comparable with the inherent delay time of the gated spectrometer.

6. A method as defined in claim 5, and further comprising:

generating from the radiometer output pulse an additional signal indicative of the magnitude of the pulse; and adjusting the gain of the gated spectrometer in an inverse relationship to the additional signal indicative of magnitude, whereby more powerful pulses are intensified to a lesser degree in the gated spectrometer.

7. A method as defined in claim 6, and further comprising:

generating from the gated spectrometer an output data signal indicative of the wavelength of the detected laser pulse;

processing the output data signal to reduce the effect of detector and scene background;

converting the resultant output data signal to a quantity indicative of wavelength; and classifying the pulse in accordance with its measured wavelength.

8. A method as defined in claim 7, and further comprising:

generating from the radiometer output pulse signals indicative of pulse shape; and storing wavelength and pulse shape parameters characterizing the detected laser pulse.

* * * * *